United States Patent [19]

Kobelt

[11] 4,375,771

[45] Mar. 8, 1983

[54] RESILIENT CONTROL LINK ASSEMBLY

[76] Inventor: Jacob Kobelt, 6110 Oak St., Vancouver, British Columbia, Canada, V6M 2W2

[21] Appl. No.: 228,764

[22] Filed: Jan. 27, 1981

[51] Int. Cl.³ .............................................. G05G 1/04
[52] U.S. Cl. ...................................... 74/470; 74/519; 403/2; 403/100
[58] Field of Search ............. 74/470, 519; 192/109 A; 403/2, 100, 102

[56] References Cited

U.S. PATENT DOCUMENTS

| 349,551 | 9/1886 | Wheelock | 74/470 |
| 486,687 | 11/1892 | Swarthout | 74/470 X |
| 1,427,684 | 8/1922 | Grieves | 74/470 |
| 2,427,621 | 9/1947 | Peterson | 64/27 |
| 2,527,385 | 10/1950 | Alix et al. | 139/156 |
| 3,521,917 | 7/1970 | King | 403/2 |
| 3,878,926 | 4/1975 | Adachi | 74/470 X |

Primary Examiner—Allan D. Herrmann

Attorney, Agent, or Firm—Carver & Co.

[57] ABSTRACT

A resilient control link assembly for a control system for transmitting a mechanical signal from a transmitter to a receiver so as to prevent component damage resulting from force overload situations due to response differences of components, fluid pressure failure, etc. The assembly includes two link elements which cooperate with the receiver and transmitter and are hinged together at a main hinge for relative swinging thereabouts from a datum relationship. Two following members are hinged to the first link element for rotation about a follower hinge spaced from the main hinge and are adapted to contact the second link element. A resilient member interconnects the two following members to force the members to cooperate with the second link element to maintain the link element in the datum relationship. When the datum relationship is disturbed, the following members are moved apart and the resilient means opposes this movement tending to draw the link elements back into the datum relationship.

11 Claims, 4 Drawing Figures

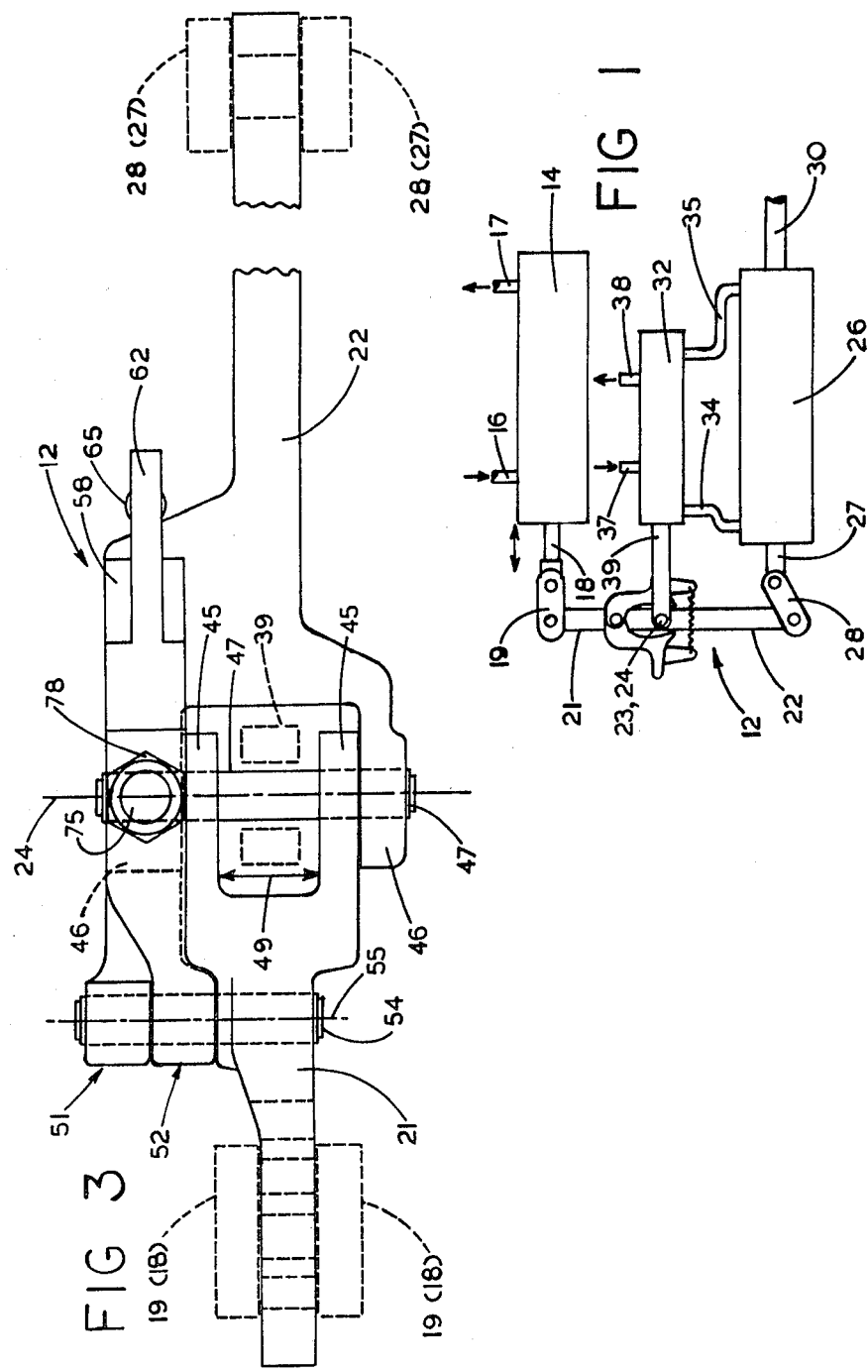

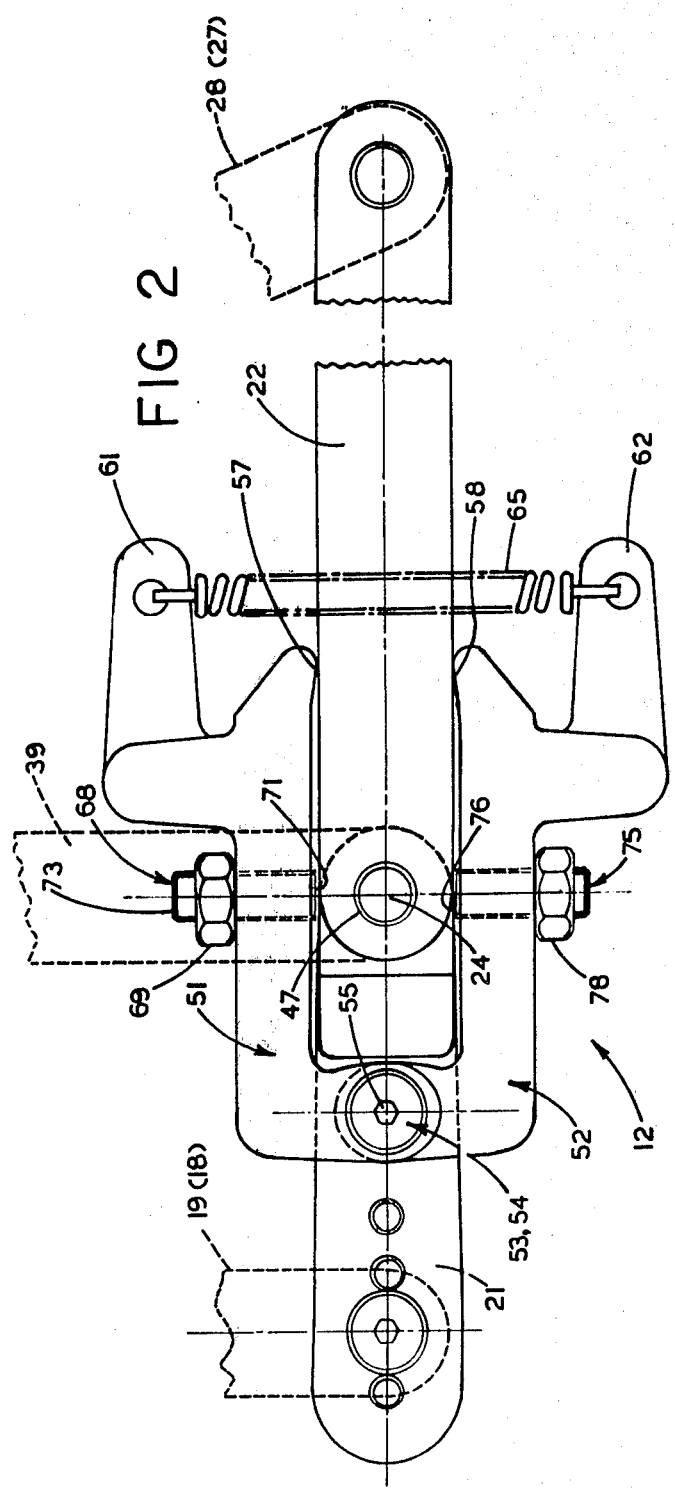

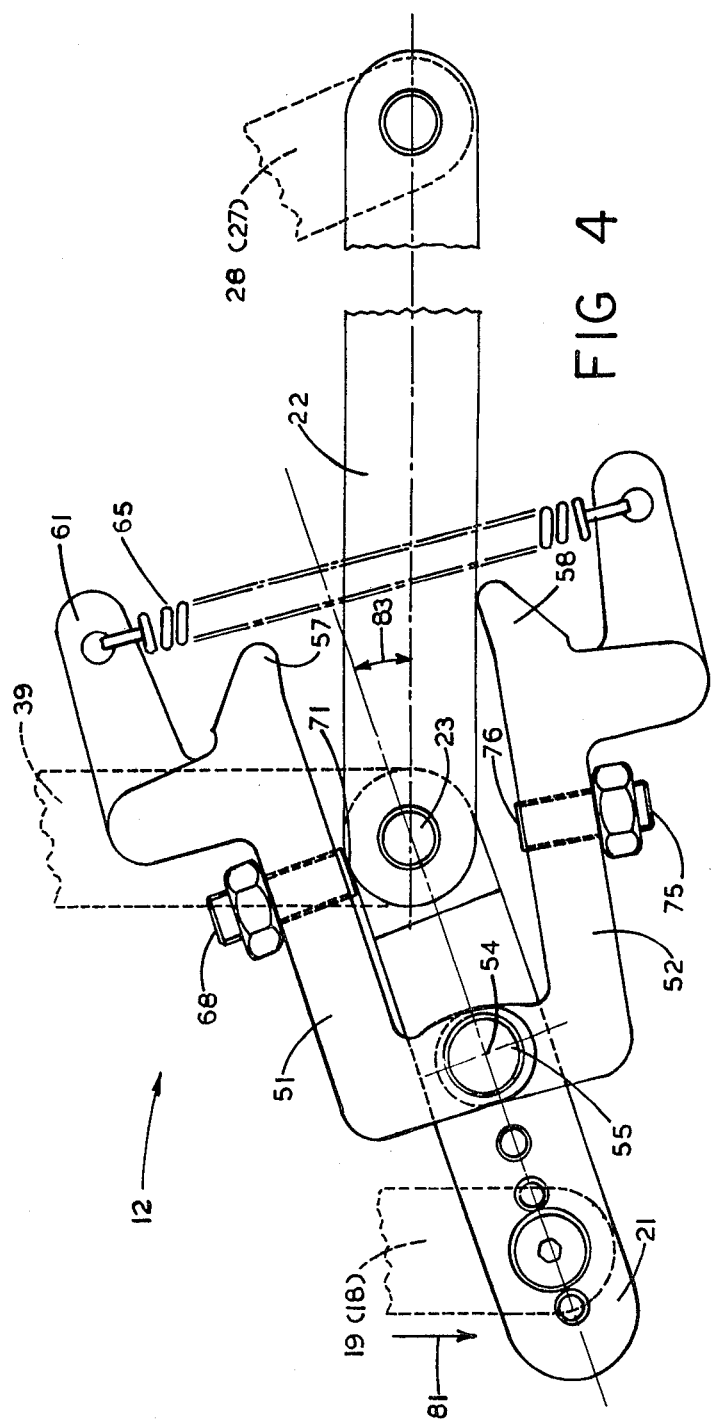

RESILIENT CONTROL LINK ASSEMBLY

BACKGROUND OF THE INVENTION

1. Field of the Invention

The invention relates to a link mechanism for transmitting a mechanical signal in which the link mechanism has a selected resilience to accommodate force overload situations without breakage, and is particularly adapted for use in hydraulic and/or pneumatic control systems as used in marine vessels.

2. Prior Art

Resilient control link assemblies have been used for many years in control systems as typically found on marine vessels. Such links are designed to accommodate force overload situations resulting from inequality of responses between a transmitter and a receiver, alignment errors resulting from accumulation of tolerances, conflicting control signals, fluid pressure failure in at least one of the components and other applications wherein a link connecting at least two components would be subjected to excessive forces which could damage the link, and/or the component or components.

A typical prior art link is a self-centering spring link which has axially aligned telescoping components connected by spring means so that the spring means will yield under excessive loads to permit relative movement between the telescoping components. This relative movement permits a receiving or driven component with a slow response to follow relatively faster movement of a transmitting or driver component. With a slow response driven component, the spring stores energy and thus delays transmission of the signal, allowing the slower moving driven conponent to "catch up" to the faster driver component.

Various devices have been designed to accommodate excessive movement between two interconnected components in a particular plane using hinged members and coil springs. These devices have had applications in widely different fields and one example of a device having hinged members and springs is shown in U.S. Pat. No. 2,427,621 for a REMOTE CONTROL SYSTEM issued to Peterson. Whilst this patent discloses a pair of hinged members cooperating with at least one spring, it functions in a different manner from the present invention, and would be inappropriate for use in some applications of the present invention. Some prior art devices are complex and require electrical power and other equipment, and furthermore, response of some of these devices would be inappropriate for applications of the present invention.

SUMMARY OF THE INVENTION

The invention reduces difficulties and disadvantages of the prior art by providing a simple, wholly mechanical linkage assembly which interconnects a plurality of components and has a resilient means which can delay movement of a driven member or receiver in response to a mechanical signal from a driver or transmitter to permit the driven member to respond to the signal at its own speed. The assembly is easily adaptable to be fitted within existing hydraulic and/or pneumatic systems and can be easily adjusted to accommodate components which are slightly malaligned or out of position with negligible lost motion problems. Furthermore, the device can be adjusted to follow a wide range of movement of the driver member which is later transferred, at a particular rate, to the driven member.

A resilient control link assembly according to the invention cooperates with a fulcrum means and is adapted to transmit a mechanical signal from a transmitter to a receiver. The control link has first and second link elements, a pair of following members and a resilient means. The first and second link members are hinged together at a main hinge for swinging thereabouts relative to each other, and are adapted to be disposed relative to each other in a datum relationship. The transmitter and receiver each cooperate with at least one of the link elements. Each following member is hinged to the first link element for rotation about a follower hinge spaced from the main hinge, and also has first second contact portions spaced at different spacings from the follower hinge and adapted to contact the second element. The resilient means interconnects the two following members to force the members to cooperate with the link elements to maintain the link elements in the datum relationship. Thus, when there is relative angular movement between the link elements to disturb the datum relationship therebetween, the following members are moved apart and the resilient means opposes this movement, tending to draw the link elements back into the datum relationship.

An alternative resilient control link assembly similarly cooperates with a fulcrum means, and is adapted to transmit a mechanical signal from a transmitter to a receiver, and similarly includes first and second link elements, a pair of following members and resilient means. The first and second link elements are hinged together at a main hinge for swinging thereabouts relative to each other and are adapted to be disposed relative to each other in a datum relationship. The transmitter and the receiver each cooperate with at least one of the link elements. Each following member is hinged to the first link element for rotation about a follower hinge spaced from the main hinge. Each following member also has a first contact portion disposed on a side of the main hinge remote from the follow hinge, so that at least one particular contact portion is adapted to contact the second link element. The resilient means interconnects the two following members to force at least the particular contact portion into engagement with the second link element so as to maintain the link elements in the datum relationship. Thus, where there is relative angular movement between link elements to disturb the datum relationship therebetween, the following members are moved apart and the resilient means opposes this movement and forces the particular contact portion against the second link element. This tends to draw the link elements back into the datum relationship.

A detailed disclosure following, related to drawings, describes a preferred embodiment of the invention which is capable of expression in structure other than that particularly described and illustrated.

DESCRIPTION OF THE DRAWINGS

FIG. 1 is a simplified schematic of one example of a resilient control link assembly according to the invention within a particular environment utilizing hydraulic and pneumatic components, FIG. 2 is a simplified top plan at an enlarged scale of the resilient link assembly in a datum relationship showing cooperation in the environment of FIG. 1, FIG. 3 is a simplified side elevation of the link assembly of FIG. 2, with some portions omitted for clarity, and FIG. 4 is a simplified fragmented top plan of the link assembly shown displaced from a datum position.

DETAILED DISCLOSURE

FIG. 1

A hydraulic/pneumatic system 10 as typically found on a marine vessel utilizes a resilient control link assembly 12 according to the invention. Only a portion of the system is shown and this particular system is used for controlling a marine controllable pitch propeller, but other applications of the resilient link assembly can be envisaged.

An air cylinder 14 receives pitch signals in signal input conduit 16 which signals are forward or reverse signals of varying pressure. The cylinder has an exhaust conduit 17 and an output shaft 18 which is extensible and retractable of the cylinder and is responsive to the pitch signals. A coupling link 19 extends from an outer end of the shaft 18 to the assembly 12. The assembly 12 has first and second link elements 21 and 22 which are hinged together at a main hinge 23 for swinging relative to each other about a main hinge axis 24, the element 21 being coupled via the link 19 to the shaft 18. Further details of the link assembly 12 will be described with reference to FIGS. 2 through 4.

The system 10 includes a hydraulic positioning cylinder 26 which has an input shaft 27 coupled by a coupling link 28 to the link element 22, and an output shaft 30 connected to pitch changing mechanism, not shown. The positioning cylinder 26 has a four-way valve 32 rigidly connected thereto with conduits 34 and 35 communicating with opposite ends of the cylinder. The valve has input and output fluid conduits 37 and 38 and has a spool, not shown, controlled by a control shaft 39 which directs fluid flow between the conduits 34, 35, 37 and 38. The shaft 39 has an outer end connected to the main hinge 23 of the assembly 12 and thus serves as a partial fulcrum means, as in a "teeter-totter" arrangement, which cooperates with the assembly 12 and the link elements 21 and 22.

When the system is operating, a change in pitch signal at the air cylinder 14 results in longitudinal movement of the shaft 18 which is reflected by displacement of the links 21 and 22 in an amount which is dependent in part on resistance to movement of the shafts 39 and 27. In a datum relationship, the links 21 and 22 will normally be aligned as shown, and with a slow change in pitch signal, the link assembly will act as a rigid link and will rock about the shafts 39 and 27, thus displacing the spool to redirect fluid to the cylinder 26 which shifts in an amount proportional to the change in signal. However, if a pitch change signal from the cylinder 14 occurs sufficiently quickly, ie. faster than response of the cylinder 26, the link members 21 and 22 will likely become misaligned. This misalignment is due to resilience in the link assembly 12 and differences in speeds of response of the cylinders 14 and 26, and resistance to movement of the shaft 39. As will be described with reference to FIGS. 2 through 4, the link 12 has a resistance to deflection, ie. the link assembly 12 has stiffness, which is sufficient to maintain the link members 21 and 22 in alignment for a slow pitch signal change from the cylinder 14, and yet to yield in response to a fast pitch signal change in an amount proportional to speed of the input signal, resilience of the link assembly 12, change in pitch signal and resistance to movement of the positioner cylinder 26 and associated control valve 32. Also, if there were a hydraulic pressure failure to the valve 32, there is sufficient resilience in the link assembly 12 to accommodate a full range of movement of the output shaft 18 with no corresponding movement of the shaft 27. This results in a large misalignment of the link elements with no damage to the components so that when the hydraulic pressure is re-established, the datum or "zero" of the system has not been lost or disturbed. This contrasts with some prior art links where such excessive movement of one component without corresponding movement of another would result in permanent deformation of the link or related component, with a resulting loss or disturbance of the datum of the system. This could have serious consequences as the datum disturbance may not be readily apparent.

In summary, the output shaft 18 and associated coupling link 19 serve, in effect, as a transmitter which cooperates with one link element, that is the first link element, and the input shaft 27 and associated coupling link 28 serve as a receiver cooperating with the remaining link element, that is the second link element.

FIGS. 2 and 3

The first and second link elements 21 and 22 of the link assembly 12 are shown disposed relative to each other in a datum relationship, that is with undesignated longitudinal axes thereof aligned with each other. The link elements 21 and 22 are two essentially straight link portions, having respective inner ends provided with pairs of spaced ears 45 and 46 respectively as shown. The ears of the inner ends have undesignated aligned openings to receive a main hinge pin 47 passing therethrough concentric with the main hinge axis 24, thus forming the main hinge 23. The ears of each inner end form clevices and the first link portion has a narrow clevice which fits within a broad clevice of the second link portion. Spacing 49 between the ears 45 of the narrow clevice of the first link portion is adapted to receive an outer end of the control shaft 39, or, as will be described later, either one of the shafts 18 or 27 which would be substituted for the control shaft 39 when the shaft 39 is hinged to an outer end of one of the link elements. Thus, preferably at least one of the link elements has an inner end having a pair of ears to receive the inner end of the remaining link element therebetween.

The assembly 12 also has a pair of following members, namely first and second following members 51 and 52, each following member being hinged to the first link member on a follower hinge pin 54 which is spaced longitudinally from the pin 47. Thus, the following members are hinged to the first element for rotation at inner ends thereof about a follower hinge 53 spaced from the main hinge and having a follower hinge axis 55. The following members have foot portions 57 and 58 and spring connections 61 and 62 respectively adjacent outer ends thereof as shown. A tension coil spring 65 extends between the spring connections 61 and 62 so as to draw the foot portions towards each other to contact the second link element therebetween. Thus it can be seen that each following member has a first contact portion, namely the respective foot portion, spaced from the follower hinge axis 55 and adapted to contact the second element. The strength of the spring and spacing or moment arm between the various hinge axes, the spring, and the foot portion determines, in part, effective stiffness of the link assembly.

The first following member 51 has a threaded opening to receive a short threaded shaft 68 carrying a lock nut 69. The shaft 68 has an inner end 71 adapted to contact the second link member 22, and an outer end 73 fitted with a screw driver slot for turning the shaft. The inner end 71 of the screw thus provides a second contact portion for the following member which contacts the second link member and is spaced at a different spacing from the follower hinge axis than the first contact portion, that is the foot portion 57. Similarly, the second following member 52 has a threaded shaft 75 having an inner end 76 to provide a second contact point, the shaft 75 being located by a lock nut 78. Thus, each following member has first and second contact portions spaced at different spacings from the follower hinge. It can be seen that the threaded shafts 68 and 75 serve as screw thread means cooperating with the respective following members such that relative rotation between the screw thread means and the following member permits fine adjustment of the second contact portion relative to the following member as will be described. In effect, the spacing of the second contact portion is adjustable relative to the first contact portion. Thus, when the link assembly 12 is in the datum relationship, the second contact portion can be adjusted to contact the second link member simultaneously with the first contact portion, which adjustment will accommodate variations in angular relationship between the two link elements resulting from manufacturing or positional errors, etc.

OPERATION

FIGS. 1 and 2

Some aspects of the operation have been described previously and it can be seen that the output shaft 18, ie. the signal transmitter, shifts the first link element 21 laterally, and the second link element 22, which might follow this motion partially, swings about the link 28 at an outer end thereof and at the shaft 39. If the link assembly 12 but insufficient stiffness, the link elements 21 and 22 are disturbed from the aligned datum relationship as shown in FIG. 1 in an amount proportional to various factors as discussed, in particular relative moment arms and strength of the coil spring 65.

FIG. 4

For convenience it is assumed that the output shaft 18 is extending from its cylinder which causes the link 19 to move in direction of an arrow 81 at a rate faster than response of the system. The resilient control link assembly 12 is thus displaced from the datum relationship and there is relative swinging movement about the main hinge axis 24 which causes the link elements 21 and 22 to become non-aligned as shown and disposed at an angle 83 relative to each other. It can be seen that when the link element 21 is displaced generally towards the following member 52, the following member 52 is displaced not only by the hinged inner end thereof, but also by contact between the foot portion 58 and the second link element 22, causing the inner end 76 of the threaded shaft 75 to lift off the element 22. Such displacement results in increase in tension in the spring 65 which increases force on the following member 51, thus tending to draw the following member 51 in the direction of movement of the member 52. However this tendency is restrained by contact between the inner end 71, ie. the second contact portion, and the second link element. When the link elements are non-aligned as shown, the foot portion 57 has disengaged the second link element 22 and it cannot re-engage the second link member until the link elements are re-aligned in the datum relationship. This would occur when the input shaft 27 of the positioner cylinder 26, through the link 28 and the control shaft 39 of the valve 32, has shifted to accommodate movement resulting from additional force applied by the following members to the second link elements and/or when the control shaft 39 has shifted.

It has been found that, by making at least one of the contact points on each following member adjustable, fine adjustment of the alignment between the first and second link elements is possible. Thus, in a particular installation, if the relative positions of outer ends of the shafts 18, 39 and 27 are such that the resilient link assembly 12 does not form a straight line in the datum relationship, that is the link elements 21 and 22 are slightly misaligned, this misalignment can be accommodated by use of the fine adjustment as follows. The threaded shafts 68 and 75 are adjusted so that the four contact points, ie. the two foot portions and the inner ends of the two threaded shafts are brought simultaneously into contact with the second link member in the datum relationship. Suitable design of the foot portion and adjustable second contact portion allows for a considerable degree of misalignment of the two link elements, for example, up to 10 to 15 degrees. It can be seen that, with fine thread adjustment, it is possible to attain essentially zero lost motion in the link assembly which is of considerable importance in retrofit applications where components are inaccurately located, and where accurate control response is required. Thus, by this means a datum or "zero" position can be established between coupled components, and this can be re-established following component servicing, or adjusted to accommodate wear, etc.

Thus, in summary, it can be seen that each following member has a first contact member disposed on a side of the main hinge remote from the follower hinge so that at least one particular contact portion is adapted to contact the second link element. Also, when there is relative angular movement between the link elements 21 and 22 which temporarily disturbs the datum relationship therebetween, a particular first contact portion of one of the following members is contacted by and displaced by the second link element, and the first contact portion of the remaining following member is disengaged from the second link element. It can be seen that the spring 65 exerts a force to draw the remaining following member back into contact with the second link element, and that this force is proportional to displacement of the link element from the datum relationship. It can be seen that the tension coil spring 65 is a resilient means interconnecting the two following members to force the members to cooperate with one of the link elements to maintain the link elements in the datum relationship. In effect the resilient means forces at least the particular contact portion into engagement with the second link element so as to maintain the link elements in the datum relationship. Thus, when the following members are moved apart, the resilient means opposes this movement and forces the particular contact portion against the second link element, thus tending to draw the link elements back into the datum relationship.

ALTERNATIVES AND EQUIVALENTS

The resilient means is shown to be a tension coil spring interconnecting outer ends of the following members which are forced to cooperate with the link elements tending to hold the link elements in the datum relationship. Clearly, an alternative and equivalent resilient means can be substituted to cooperate with the following members to achieve a similar action.

As disclosed, the following members are shown hinged to the first link element which cooperates with the transmitter, and the first contact portions of the following members cooperate with the second link element which cooperates with the receiver. Clearly, in some applications, these positions can be reversed. Also, it is seen that each following member is hinged to the first link element and has an inner end having a hinge portion to permit swinging about the follower hinge axis, and an outer end having a foot portion to provide the first contact portion to contact the second link element. This arrangement can also be varied to some extent.

As illustrated, each adjustable second contact portion, ie. the threaded shaft, is positioned on an intermediate portion of the respective following member to provide a second contact portion spaced from the foot portion and disposed between the foot portion and hinge portion of the following member. Clearly, the second contact portion can be made non-adjustable, with equivalent adjustment means fitted on the first contact portion, that is adjacent the foot portion, because in some installations it might be more convenient to locate the fine adjustment means furthest from the follower hinge axis. It can be seen that alternative arrangements can be provided to achieve a similar purpose.

As described, the shaft 39 serves as a partial or intermittent fulcrum means of a "teeter-totter" arrangement, but is in fact a movable member which controls movement of the receiver and thus is not a fixed fulcrum as in a normal teeter-totter arrangement. In fact, the link 28 of the cylinder 26 or receiver also serves as a partial or intermittent fulcrum means because the link assembly rocks or swivels alternately between the shafts 27 and 39 until a balanced position is again attained following a change in pitch signal. Also, as previously stated, either of the shafts 18 or 27, with or without coupling links, can be fitted between the ears 45 of the first link member. This provides two alternative reversed teeter-totter arrangements in which the hinge pin 47 either receives a signal, or transmits it. In either arrangement, an outer end of one of the link elements can be hinged to a fixed fulcrum means, and the outer end of the other element performs the reversed function of the component connected to the hinge pin 47. Clearly, the alternating swivelling inter-relationship between the rods 27 and 39 is not essential to the use of this invention in another application, and a fixed fulcrum means could be substituted for the partial or intermittent fulcrum means as illustrated.

I claim:

1. A resilient control link assembly cooperating with a fulcrum means and being adapted to transmit a mechanical signal from a transmitter to a receiver, the control link assembly having:
    (a) first and second link elements hinged together at a main hinge for swinging thereabouts relative to each other and adapted to be disposed relative to each other in a datum relationship; the transmitter and the receiver each cooperating with at least one of the link elements,
    (b) a pair of following members, each following member being hinged to the first link element for rotation about a follower hinge spaced from the main hinge, and each following member also having a first contact portion disposed on a side of the main hinge remote from the follower hinge, so that at least one particular contact portion is adapted to contact the second link element,
    (c) resilient means interconnecting the two following members to force at least the particular contact portion into engagement with the second link element so as to maintain the link elements in the datum relationship,
    so that when there is relative angular movement between the link elements to disturb the datum relationship therebetween, the following members are moved apart and the resilient means opposes this movement and forces the particular contact portion against the second link element, thus tending to draw the link elements back into the datum relationship.

2. A resilient control link assembly cooperating with a fulcrum means and being adapted to transmit a mechanical signal from a transmitter to a receiver, the control link assembly having:
    (a) first and second link elements hinged together at a main hinge for swinging thereabouts relative to each other and adapted to be disposed relative to each other in a datum relationship; the transmitter and the receiver each cooperating with at least one of the link elements,
    (b) a pair of following members, each following member being hinged to the first link element for rotation about a follower hinge spaced from the main hinge, and each following member also having first and second contact portions spaced at different spacings from the follower hinge and adapted to contact the second link element,
    (c) resilient means interconnecting the two following members to force the members to cooperate with one of the link elements to maintain the link elements in the datum relationship,
    so that when there is relative angular movement between the link elements to disturb the datum relationship therebetween, the following members are moved apart and the resilient means opposes this movement, tending to draw the link elements back into the datum relationship.

3. A resilient control link assembly as claimed in claim 1 wherein each following member is further characterized by:
    (a) a second contact portion spaced at a different spacing from the follower hinge than the first contact portion.

4. A resilient control link assembly as claimed in claim 3 or 2 wherein:
    (a) spacing of the second contact portion is adjustable relative to the first contact portion,
    so that the second contact portion can be adjusted to contact the second link element simultaneously with the first contact portion to accommodate variations in angular relationship between the two link elements.

5. A resilient control link assembly as claimed in claim 1 wherein:

(a) each following member has an inner end having a hinge portion of the follower hinge to permit swinging about the follower hinge, and an outer end having a foot portion to provide the first contact portion to contact the second member.

6. A resilient control link assembly as claimed in claim 5 wherein:
(a) each following member has an intermediate portion to provide a second contact portion spaced from the foot portion and disposed between the foot portion and the hinge portion of the following member,
so that following the relative angular movement which disturbs the datum relationship, the first contact portion of one of the following member is displaced by the second link element and the first contact portion of the remaining following member is disengaged from the second link element, with the resilient means exerting a force to draw the remaining following member back into contact with the second link element.

7. A resilient control link assembly as claimed in claim 6 or 2 in which the second contact portion is characterized by:
(a) screw thread means cooperating with the respective following member such that relative rotation between the screw thread means and the following member permits fine adjustment of the second contact portion relative to the following member.

8. A resilient control link assembly as claimed in claim 1 or 2 wherein:
(a) the link elements are two essentially straight link portions, at least one of which has an inner end having a pair of ears to form a clevice to receive an inner end of the remaining link element therebetween, the inner ends having aligned openings to receive a main hinge pin for hinging at the main hinge axis.

9. A resilient control link assembly as claimed in claim 1 or 2 wherein:
(a) each link element has a clevice having a pair of spaced ears having aligned openings therein to receive a main hinge pin for hinging at the main axis,
(b) one link having a narrower clevice which fits within a broader clevice of the remaining link, the narrower clevice also having a space between the ears thereof to receive either the fulcrum means, the transmitter means or the receiver means which is adapted to be hinged on the main hinge pin.

10. A resilient control link assembly as claimed in claim 1 or 2 further characterized by:
(a) the fulcrum means is a movable member which controls movement of the receiver and is hinged to the main hinge to provide a partial fulcrum means of a teeter-totter arrangement.

11. A resilient control link assembly as claimed in claim 1 or 2 in which:
(a) the fulcrum means is a movable member which controls movement of the receiver, and is hinged to a hinge pin at the main hinge to provide a partial fulcrum means of a teeter-totter arrangement,
(b) the transmitter is hinged to the first link element,
(c) the receiver is hinged to the second link element.

* * * * *